United States Patent
Levine

(10) Patent No.: US 6,243,030 B1
(45) Date of Patent: *Jun. 5, 2001

(54) ELECTRONIC WIRELESS NAVIGATION SYSTEM

(76) Inventor: Alfred B. Levine, P.O. Box 34-1738, Bethesda, MD (US) 20827

( * ) Notice: Subject to any disclaimer, the term of this patent is extended or adjusted under 35 U.S.C. 154(b) by 0 days.

This patent is subject to a terminal disclaimer.

(21) Appl. No.: 09/536,129

(22) Filed: Mar. 28, 2000

Related U.S. Application Data

(62) Division of application No. 09/372,573, filed on Aug. 12, 1999.

(51) Int. Cl.[7] .................................................. G08G 1/07
(52) U.S. Cl. ..................... 340/995; 340/991; 340/990; 364/449; 701/213
(58) Field of Search ..................... 340/995, 990, 340/991; 364/449; 701/213

(56) References Cited

U.S. PATENT DOCUMENTS

| | | | |
|---|---|---|---|
| 5,179,519 | * 1/1993 | Adachi et al. | 364/449 |
| 5,689,252 | * 11/1997 | Ayanoglu et al. | 340/991 |
| 5,699,255 | * 12/1997 | Nanba et al. | 364/449.6 |
| 5,739,772 | * 4/1998 | Nanba et al. | 340/990 |
| 5,774,830 | * 6/1998 | Tsuji | 701/213 |
| 6,140,943 | * 10/2000 | Levine | 340/995 |

\* cited by examiner

Primary Examiner—Daniel J. Wu
Assistant Examiner—Tai T. Nguyen

(57) ABSTRACT

An electronic navigation system using wirelessly tranmitted video map images from one or more ground based tranmitters together with wireless receivers having visual display available to travelers, for receiving and displaying the video map images. In one embodiment a cellular system is provided using video map images covering different zones or cells of a city or other community. GPS reception is combined to additionally provide location, direction, and speed parameters on the received video maps. Transmitted video image information may also include names of streets, roads, as well as places of interest and to obtain service and assistance in emergencies. Interactive controls are provided as supplements to assist travelers in obtaining specific information as well as additional information.

24 Claims, 4 Drawing Sheets

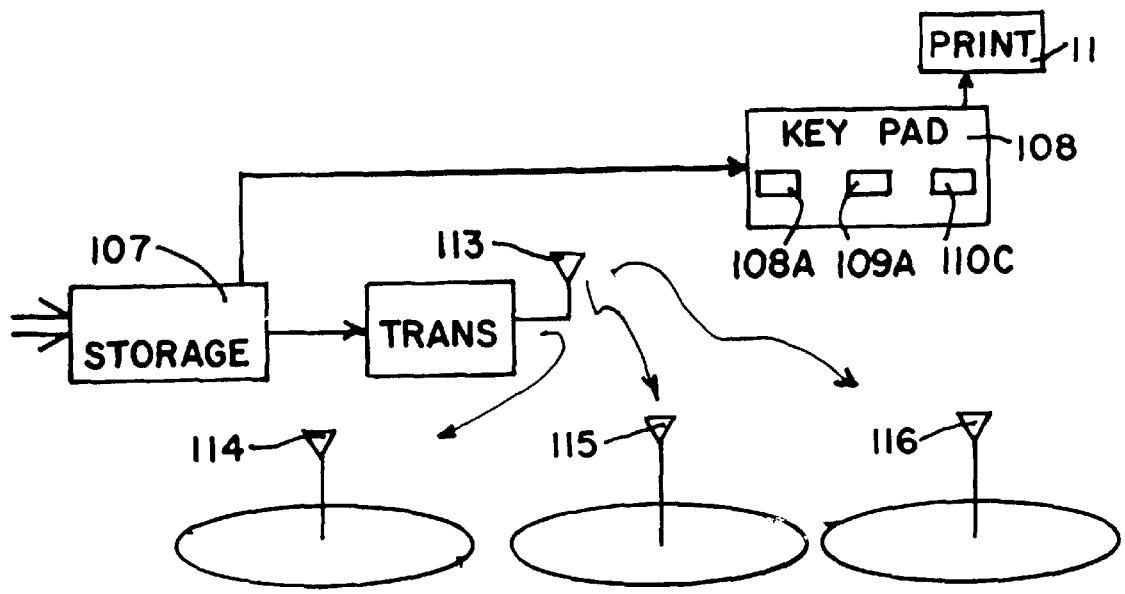
FIG. 13
FIG. 14
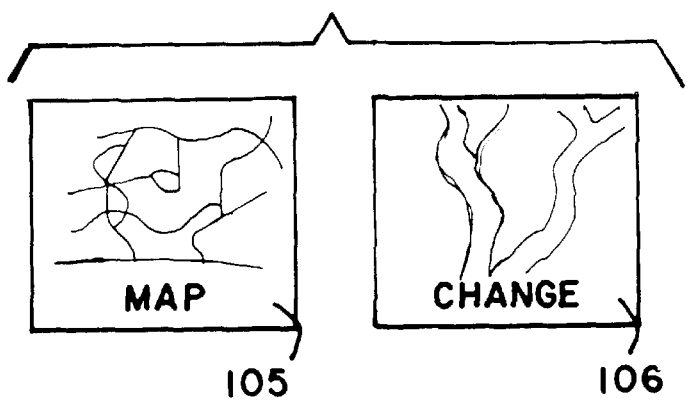

ELECTRONIC WIRELESS NAVIGATION SYSTEM

This is a division of application Ser. No. 09/372,573, filed Aug. 12, 1999, for ELECTRONIC WIRELESS NAVIGATION SYSTEM.

This invention generally relates to, electronic navigation systems, and more particularly to such systems using wirelessly generated video map images.

BACKGROUND

It is often difficult for travelers to navigate in unfamiliar cities, particularly at nighttime or in other periods of limited visibility. Locating smaller streets and roads is often time consuming since street and roadsigns are often unlighted and/or obscured or partially obscured by trees and other vegitation. Most travelers use printed maps, but more recently GPS systems are becoming more available as are INTERNET navigation systems to electronically guide travelers. However, such electronic systems use prerecorded maps on CD-ROM or other recording medium and often do not contain information on current road repairs, newer streets, detours, and other changes that have occured since the map information was originally recorded. Furthermore at nightime and at other times of poor visibility, it is difficult to correlate the map information with visible landmarks, such as street signs.

SUMMARY OF INVENTION

According to the invention there is provided a system for wirelessly transmitting video maps and other information from localized ground transmitters, to provide enlarged, detailed maps of different zones of a city, town, village, or other area to travelers. In one embodiment, one or more wireless transmitters are provided in each different zone of urban or suburban areas, with each transmitting enlarged video maps of its own zone or area, adapted to be received and displayed by video receivers carried by travelers. As the traveler proceeds from one zone to the next, the map display on his receiver changes to display the enlarged map of that next area. The traveler's receiver may also receive GPS navigation information from existing GPS satellites and/or receive information over the INTERNET from wireless connection to an INTERNET network. Additionally, one preferred embodiment provides interactive communication between the traveler's receiver and the local ground transmitter to provide the traveler with additional information, services, and assistance as may be required.

BRIEF DESCRIPTION OF THE DRAWINGS

FIG. 13 also illustrates the updating of transmitters, and

FIG. 14 shows the separate display of changes in the map zones.

DETAILED DESCRIPTION OF PREFERRED EMBODIMENTS

Figure 1:
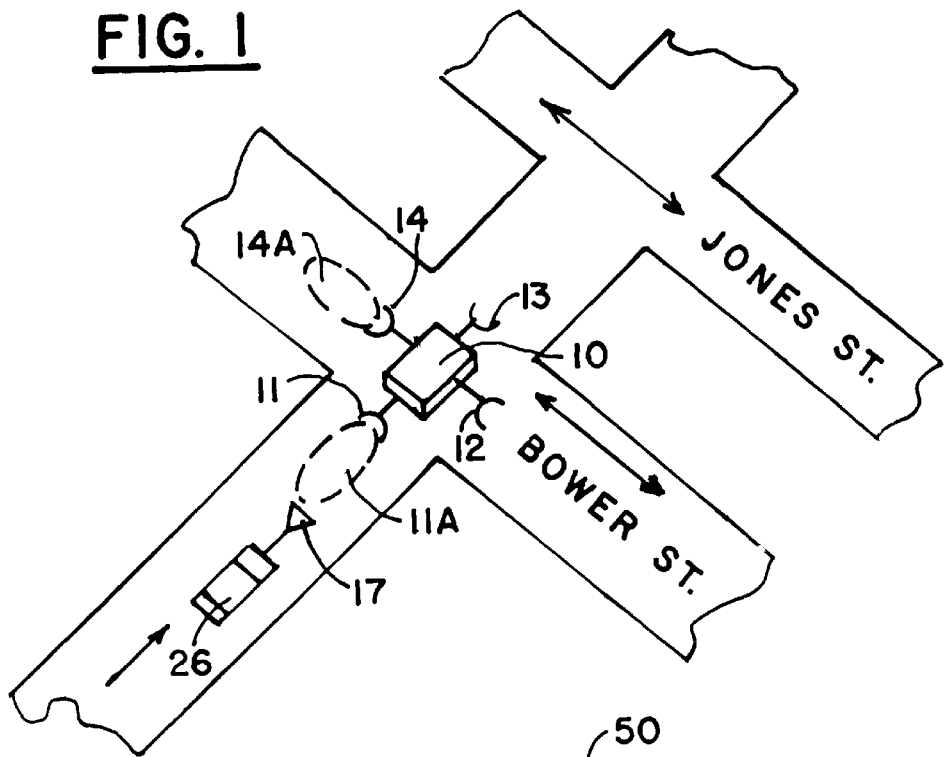
FIG. 1 is a plan view schematically ilustrating a ground transmitter and receivers at a street intersection.

Referring to the drawings there is shown in FIG. 1 a wireless ground tranmitter 10 that is located at a major street intersection of a city, town, village, or suburban area. The transmitter 10 is provided with an omnidirectional transmitting antenna, or a series of directionally oriented antenna 11, 12, 13, and 14, each transmitting a short range direction beam 11a, 12a, 13a, and 14a, directed outwardly along the different streets feeding into the intersection. The tranmitter 10 sends one or more pages of video information, including local maps, wider area maps, and additional video pages containing graphic images and printed data of interest to travelers, as will be discussed in more detail below.

Figure 3:
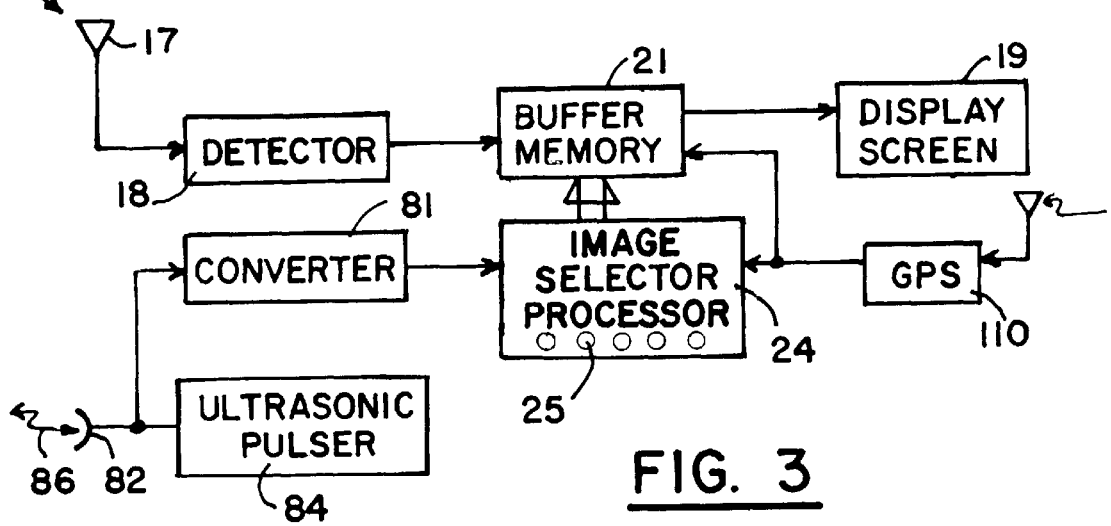
FIG. 3 is a block diagram showing major components of a video map receiver adapted to be hand carried by a traveler, or be mounted in the dashboard of an auto.
Figure 4:
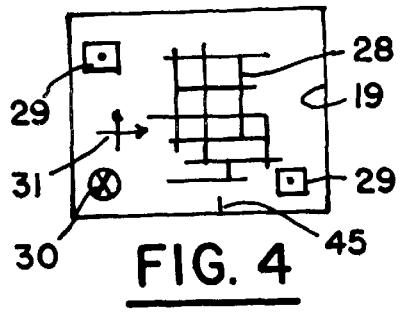
FIG. 4 is a plan view of a receiver display screen showing one page of a detailed local map of a city zone.

A pedestrian or auto 26 proceeding along any of the streets leading to the ground transmitter 10, and provided with a compatible video receiver (FIG. 3) receives the transmissions from the ground transmitter 10, and displays the map or other data being transmitted on its display screen 19 (FIG. 3, FIG. 4).

According to the invention, one of the transmitted video maps shows in enlarged scale, and fine detail, the streets, roadways, and landmarks of that zone of the city or area. Other video pages or images being transmitted show wider areas of the city, as well as additional data, enabling a traveler to enter or leave the city by the most convenient routes, or proceed from zone to zone to find a desired destination within the city. Still other pages may show the locations, of gas stations, restaurants, police stations, as well as significant landmarks of the city, and others. Beyond that limited zone of the city or area, there is provided the next wireless transmitter in the next contiguous zone (not shown). This next transmitter may also be located at a major street intersection, and also transmit video images of maps and other data pertaining to its own zone of the city or area. Thus, in this preferred embodiment there is provided a cellular system of dispersed video image transmitters 10, each generating enlarged video maps and other data pertaining to its own zone of the city or area. A traveler proceeding within the city receives each local zone map by video transmission from the ground transmitter 10 or transmitters in that zone, and can proceed to a desired destination by correlating the street and road signs with the displayed video maps on his receiver.

Figure 8:
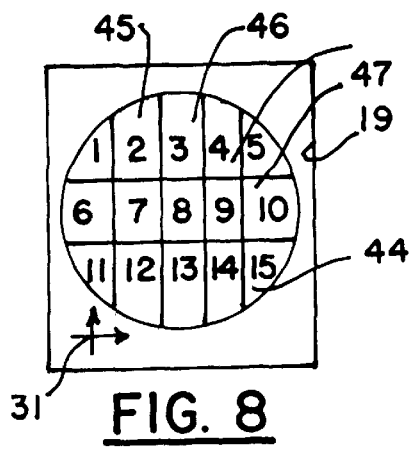
FIG. 8 is a plan view of the display screen showing a different map display.

FIGS. 4,5,6, and 8 illustrate typical maps and other displays received and displayed on the travelers display screen 19. In FIG. 4 is shown a local map of a city zone presenting in detail the streets and roadways 28 in that zone, together with gas stations 29; restaurants 30; and other places of interest and importance, such as police stations (not shown). The zone map of FIG. 4 also displays the north-south-east-west direction 31 so that the traveler can visually correlate the actual streets with those shown on the video map and determine his location and direction of travel. The local zone map also identifies its zone in the city by a displayed number 45.

Where the traveler wishes to proceed to a different zone of the city, a different map display received from the tranmitter can be selected, as shown in FIG. 8. This video page or image shows the overall city 44, subdivided into the different zones 45, 46, 47, etc. Knowing the zone of his present location from the video page of FIG. 4, the traveler can then refer to the citywide display of FIG. 8 to determine the direction and distance necessary to navigate the city to a desired one of the zones. The citywide map of FIG. 8 may also illustrate the major roadways interconnecting the various city zones (not shown). In a similar manner, an additional video map display FIG. 5 may be selected that best illustrates the major roadways 34, 35, 36 for entering and exiting the city 44, together with the major roadways 33 within the city. Thus by selecting and using the additionally transmitted video map pages of FIGS. 5 and 8, a traveler can expeditiously traverse diffferent parts or zones of the city 44; or enter or exit the city using the major routes or roadways.

Figure 5:
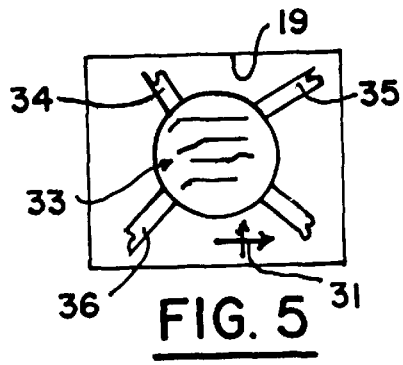
FIG. 5 is a plan view of a receiver display screen showing a different type of map display.

The different video image pages shown in FIGS. 4, 5, and 8 may be rapidly generated in sequence at each zone of the city or area, and this sequence of images can be periodically repeated at short time intervals. Thus autos or pedestrians approching each major street intersection, in each zone, receives the series of video map pages pertaining to that zone, and such series of images are stored in the buffer memory of the traveler's receiver for selective display as desired. Alternatively, the image transmitter 10 may be normally made inactive, and activated to generate the video images pages upon receiving an appropriate command from a traveler's receiver. For example, the receiver unit may be provided with a low power ultrasonic pulse generator that can be activated by the traveler, and the resulting ultrasonic pulse received by the image transmitter 10 to activate the transmitter for generation of the map(s).

It will be appreciated that the video map navigation system described above may be used by itself to provide travelers with detailed maps and related information for visually assisting in their travels through the city or area. Since such maps and data are generated by local ground based transmitters 10 at convenient street locations, the maps may be corrected or updated at regular intervals, or as needed, to show new streets, roadways, repairs, detours, and other changes. Such updating and corrections may be performed by local governments as a service to travelers, or by private fee based organizations, or free of charge by advertisers, such as gas stations, that advertise on the maps.

To provide additional assistance to travelers, the video image receivers may also contain GPS satellite receiver circuitry (Global Positioning System) that display on the screen 19 the traveler's location, direction, and even speed of movement. Such GPS receivers and circuitry are presently on the market and further description thereof is not considered necessary in the present application.

Wireless interconnection to the INTERNET is also presently in use for navigation purposes, to provide maps and other information, and such wireless networking may also be used compatibly with the navigating system of the present invention. Similarly, a traveler may have access to a cell phone, wireless business phone, or two way paging system, and any of these other communicating devices can be used to assist the traveler in the event of an emergency condition that may arise when traveling in an unfamiliar city, town, or other community. The very detailed local zone maps received as video images may also show the locations of police stations, hospitals, fire stations, and various service facilities for repair of cars, towing services and the like. Thus the availability of these auxiliary electronic navigation and communication facilities coupled with the detailed presentations in the local zone maps, permits the traveler to proceed to desired destinations as well as providing access and help when needed with minimized delay. For access to the INTERNET, for example, hand held, palm sized electronic units with display are presently available to access the INTERNET using wireless communication with a network provider. Such units may be combined with a hand held navigation receiver of the present invention or with such a receiver mounted in the dashboard of an auto.

As a traveler passes from one cellular zone to the next, the maps and related images can be erased from the memory 21 using the image selection keypad 25 on the receiver (FIG. 3), or the receiver may be adapted to automatically erase previously recorded images from the memory 21 upon receiving the next series of map images upon entry into the next cellular zone (not shown). Alternatively, a memory 21 may be included that has sufficient capacity to retain the previously stored map images as well as the newly received map images from the next zone. This enables the traveler to review previously recorded maps, if desired.

Figure 2:
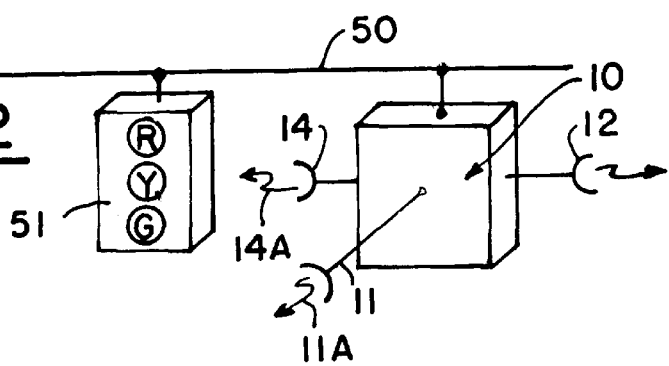
FIG. 2 is a perspective view showing a wireless video map transmitter near a traffic signal light.

As noted above, the ground based video map transmitters 10 may be low power, short range units that transmit only within limited cellular zones within the city or other community. A single transmitter 56 may be used for a small town or village, or multiple transmitters 10 used within the zones of a larger city, or one occupying a large area in square miles. The transmitters 10 may be small and low powered; and for convenience and accessibility, located near existing traffic control lights 51, as shown in FIG. 2. This enables these small units 10 to be suspended above the roadways using the same electrical cables that support and power the traffic lights 51. Similarly, the transmitters 10 may be supported on existing telephone poles, or electrical street lighting posts, thereby minimizing the need for additional electrical cables to power the transmitters 10. Alternatively, where existing electrical power sources are not available, such as along rural roads, or highways, the low power transmitters may be powered by storage batteries. When battery powered, the transmitters 10 may be normally inactive to conserve power, and be activated to transmit the map images only when receiving an activating signal from the traveler's unit, as described above.

Figure 9:
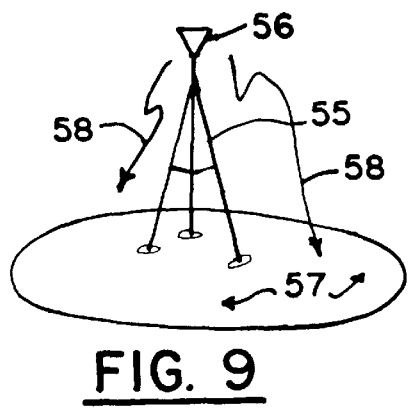
FIG. 9 is a perspective view illustrating a modified video map transmission system.

In an alternative embodiment of the invention shown in FIG. 9, only one or a lesser number of transmitters 56 may be used to cover an entire city, town, or other area, rather than a number of smaller transmitters 10 located in displaced zones of the city as discussed above. As shown in FIG. 9, a single higher power, longer range transmitter-antenna 56 is provided to generate an omnidirectional beam 58 covering the entire city 57 or extended area. The transmitter 56 is located at an upper level of a tall communication tower 55, such as presently in use for relaying cellular phone calls. In this embodiment, the single transmitter 56 radiates all of the local zone maps covering the different cellular zones of the city 57, and all of such zone maps are received by all of the traveler's receivers traveling within that city or extended area 57. Each of such local maps is identified by its own identification number and can be selectively retrieved from the receiver memory 21, as needed by the traveler, and displayed on the receiver screen 19. Additionally there is transmitted a citywide map 44, as shown in FIG. 8, showing the cellular zones of the city 45, 45, 47 etc. This citywide map enables the traveler to initially determine the zone of his present location and subsequently select the local zone map of his location for display on the receiver screen 19

Street Sign and Highway Exit Detection

Figure 6:
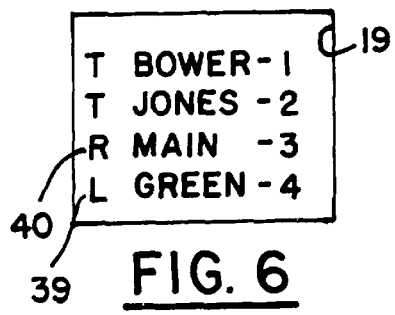
FIG. 6 is a similar view of a receiver display screenbut showing other wirelessly received data from the local zone transmitter.

To locate a desired street at nighttime or during periods of low visibility when the street signs may be obscured or partially covered by tree branches or other vegitation, the video image transmitter 10 generates an additional image page listing the next series of side streets to be reached as the traveler proceeds from the intersection of the transmitter 10, as shown in FIG. 6 and FIG. 1. As shown in FIG. 6 the first side street to be reached is "Bower" street; the next in order being "Jones" street; the third being "Main" street 40, and so forth. The video page display on the traveler's screen 19 (FIG. 6) also shows whether each such street is to the left of the traveler, or to the right, or is a through street extending in both directions. This video page display 19 shows all of the streets or roads until the traveler reaches the next city zone where the next video transmitter 10 is located (not shown), where the traveler receives a subsequent video page listing the series of streets in the next zone. Thus the traveler's receiver continual displays all of the streets and roads in each zone as the traveler proceeds, and enables the traveler to find any desired street or road despite difficulties in seeing and reading street and road signs.

As each succeeding street or road is passed, and the traveler proceeds toward the next, the previous street name may be erased from the top of the video list, leaving the remaining street names on the display. This selective erasure may be performed manually by the traveler's use of the manually actuable keyboard 24, shown in FIG. 3. Alternativeley, the traveler need only keep track of the streets being passed by comparison with the listing of the street names on the receiver display 19 (FIG. 6)

Figure 7:
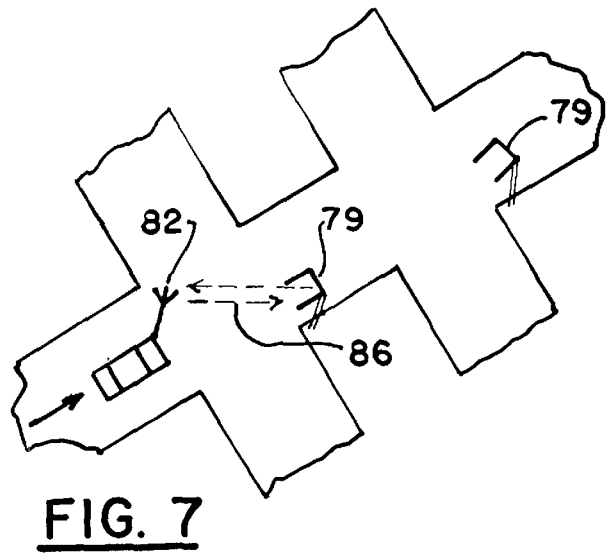
FIG. 7 is a perspective view illustrating an alternative embodiment of the invention.

Automatic erasure of the street names on the listing of FIG. 6 may also be performed as the traveler passes each street. In one embodiment, such automatic erasure may be performed using a retroreflector 79 located at each street corner, as shown in FIG. 7, and using rejected pulse signals to perform selective erasure of the street names from the video display 19 as each street is passed. Referring to FIG. 3, the traveler's receiver may be provided with an ultrasonic generator 84 and a detector transducer 82. The generator 84 repetitively generates ultrasonic pulses, and the reflection of any of such pulses by a corner retroreflector 79 (FIG. 7) is received by the receiver to selectively erase the topmost street name from the video page listing of the streets. Referring to FIG. 3, the reflected ultrasonic pulses are directed to the antenna 82, and converted into electrical control signals by converter 81 and applied to the image selector circuit 24 to selectively erase the topmost street name from the video page (FIG. 6). To prevent any spuriously received ultrasonic pulses from erroneously erasing the video display (FIG. 6), the retroreflectors 79 of FIG. 7, may be specially configured to reflect a predetermined waveform shape, and the circuit of FIG. 3 may be suitably adapted to respond only to that special waveform shape.

Highway Transmissions and Exit Display

In a similar manner as described above in FIG. 6 and FIG. 7, the present invention permits a traveler progressing along a high speed limited access highway, or other highway, to receive a video picture display of the exits ramps along such highway together with the repective distances to each such exit. To perform this function, each entry ramp to such highway may be provided with a video image transmitter 10, as described above, to tranmit one or more video image maps and video pages of other data and information. One of said video pages being a progressive listing of the series of different exits ramps following that entry ramp together with the milleage distance to each said exit ramp. As each exit ramp is reached by the traveler along said highway, a retroreflector 79 near said exit ramp reflects an ultrasonic pulse to the traveler's receiver, as described above, to selectively erase the name of that exit from the receiver video image display 19, with the remaining names of the exits being shown on the display together with the distances between exits. Thus a traveler is continually informed of all subsequent exits together with their distances, and may more reliably find a desired one of said exits and calculate the time to reach it knowing his speed of travel and the distances. Of course, a milleage detector, connected to the auto odometer (not shown) may be provided and settable by the traveler-driver to provide a warning signal when a desired exit is being approached by the auto.

If desired, the video map pages transmitted to the driver's receiver may also identify the location of gas stations, restaurants, service areas, police, and other information at each exit to assist the traveler in finding the necessary products, service, or other assistance needed. As an alternive to providing retroreflectors near each exit ramp, video image signal transmitters, as described above, may be also provided at or near the different exits to perform the functions described above as well as providing additional information. If electric power is not available at such entry and exit ramp locations, such video image transducers may be powered by storage batteries. To conserve battery power, such transmitters 10 may be low power, short range units that are normally inactive, and activated upon receipt of ultrasonic activating pulses from passing autos into transmission modes. The ultrasonic generators 84 (FIG. 3) providing such activation may be maually operated by the travelers, to eliminate unneccessary activation of the roadside transmitters where the passing travelers do not wish to receive the maps and other data.

Costs of Installation, Updating, and Maintenance

It will be appreciated that only a limited number of transmitters are required in a cellular or zoned system described above, and such transmitters need only be low power units with limited ranges of transmission within each zone or cell of the city, town or other community. To conserve power, the transmitters may be intermittently operated, and each cycle repeated at low repetition rate, or with the transmitters being normally inactive until activated by passing travelers requesting the maps and other information. The content of the transmissions is substantilly invariable with only occasional changes and updating for new and repair construction of roads, streets, and the like. According the costs for installation, repair and updating not be excessive and considered recoverable by fee charges to advertisers of services and goods displayed on the video maps. Alternatively, the video receptions may be coded and receivable only by fee paid reception, or based upon usage by travelers. Similarly, for a single transmitter system of FIG. 9, a higher power, longer range tranmitter is required at greater cost. However, only one or a smaller number of transmitters 56 is needed, and the overall costs similarly recoverable from advertisers or user fees or charges.

Supplement Street Sign Indication

Figure 10:
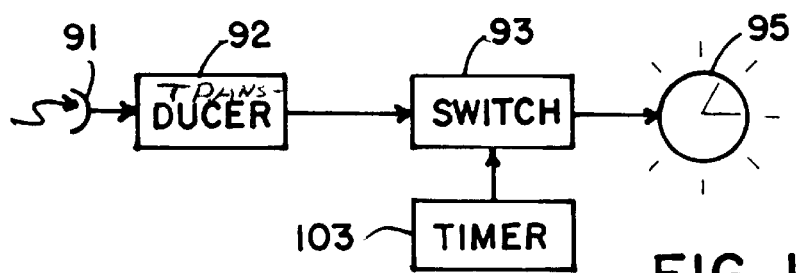
FIG. 10 is a block diagram illustrating a street sign illuminating unit.
Figure 11:
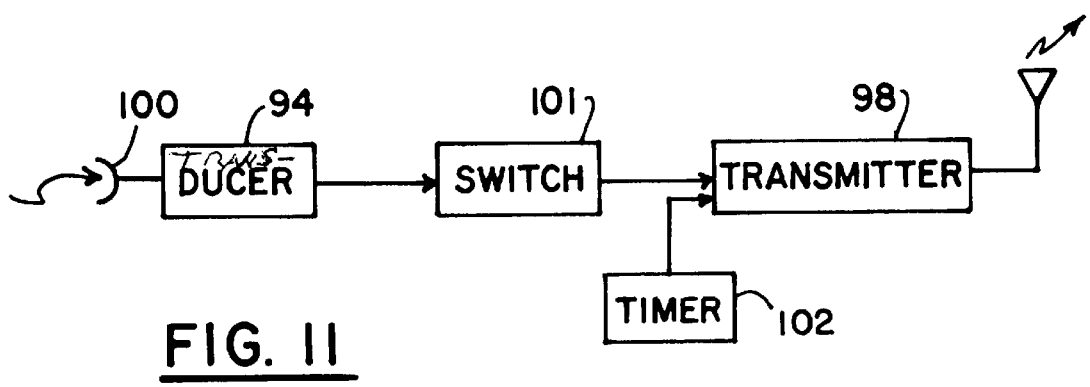
FIG. 11 is a block disgram illustrating an interactive unit for displaying a street sign.

To futher assist travelers in locating streets and roads during periods of low visibility, the present invention provides selective illumination of the signs under control of the traveler as shown in FIG. 10; or selective display of the street or road sign on the traveler's receiver screen 19 as shown in FIG. 11.

Referring to FIG. 10, the street or road signs are provided with an illuminating source 95 that is normally deenergized; and a switch 93 remotely actuated by the traveler to energize the light source 95 and illuminate the sign. Remote control of the switch 93 is in response to receipt of an ultrasonic pulse from the traveler's portable receiver or auto receiver. Such ultrasonic pulse is received by a suitable antenna 91 on the street sign, and by transducer 92. After a short period of illumination, the light source is deenergized by a timer circuit 103 (not shown). The entire illumination unit at the street sign may be designed to be very small and compact, and to require low power use from its electrical powering source (not shown). The selective illumination device of FIG. 10 may, of course, be used with or without the video page display of the series of streets discussed above and shown in FIG. 6.

FIG. 11 shows an alternative remote controlled system for displaying the street or road name in response to remote activation from a traveler's receiver unit. As shown, small unit of FIG. 11 is similar to that of FIG. 10 except it uses a small fixed message transmitter 98 to send the street name back to the Traveler. Referring to FIG. 11, the small tranmitter 98 is activated to transmit the street name in a short range, low power fixed transmission back to the traveler's receiver, to display the street name on the receiver display 19. It is activated upon receipt of an ultrasonic pulse from the traveler, received from ultrasonic antenna 100 and transducer 94 to actuate a switch 101, applying power to the small transmitter 98. As in FIG. 10, the entire unit of FIG. 11 is small and compact, and of low power consumption whereby it can be powered for long periods of time by a battery source if electrical power from cabling is not available or convenient to the location of that sign. After each transmission, a timer 102 deenergizes the transmitter 98 to conserve electrical power. The receiver display may, however, remain energized to display the street or road name until deactivated by the Traveler.

Printed Maps, Changes, Updating

Conventional printed maps are often out-of-date or incomplete in failing to show new constructions, detours, and recent additions to streets and roads that have been added after the printing of the map. Frequent reprinting of such maps is expensive and not cost effective even for the larger fee based travel clubs such as the AMERICAN AUTOMOBILE ASSOCIATION. According to the invention, such costs are reduced by storing such maps in electronic storage, as shown in FIG. 13. Reffering to FIG. 13, all of the local zone maps, citywide maps, and others discussed above may be stored in a mass storage memory within each city, town, or other community; and from such memory 107 can be selectively downloaded to the zone transmitters, or my be printed out, or otherwise conveyed to users as discussed below. If printed copies are desired at a travel club, for example, the memory 107 may be accessed by any of a series of keyboards 108A, 109B, or 110C of terminals 108, 109, and 110, as shown, to have copies printed by printer 111 at said club. Such maps may also be downloaded over coaxial cable 117 to the homes or offices of subscribers (not shown).

For use in the video map transmission system of the present invention, trhe maps and related video pages in the central mass storage memory 107 are transmitted over antenna 113 to each of the displaced zone tranmitters 114, 115, 116, and so forth, covering the different zones or cells of the city where they are retained for retransmission to the travelers as discussed above. In this manner each of the different city zone maps, and other maps, can be changed, amended or updated at the central mass storage facility 107 and then transmitted as needed to each of the zone transmitters 114, 115, 116, and others, permitting the map and related information being provided to travelers to be maintained in current most useful form. A vast library of zone maps, other maps, and related video pages having content of use to travelers may be stored and updated in such mass storage facility, located centrally within a city, town, or other community, thereby to supply information that is not otherwise available to travelers and others within that community. Such mass storage facilty 107 may be located at the central offices at each different location maintained by a nationwide Auto Travel Club. Updated maps can be periodically supplied to each such central office mass storage facility 107 using recorded tapes, discs, or long range radio transmissions from one originating facility (not shown) of such Auto Club, or major oil distribution company, or other such organization that originates and updates such maps. Since such maps and related video pages are originated, stored, and distributed in electronic form rather than in printed form, they can be more rapidly disseminated, as described above, on a nationwide distribution channel at reduced cost.

Alternatively, as shown in FIG. 14, the entire maps and video pages need not be printed, or sent by cable or telephone, or wirelessly transmitted, all as described above, but only the changes, corrections, or additions need be presented to the users or travelers. Referring to FIG. 14, the content of such changes or corrections can be presented on a separate map page 106, and used alongside the previous map page 105. The two side by side map pages 105 and 106 not only contain all of the updated information but have the advantage of emphasizing the changes by the use of a separate map 106. Thus a traveler that is already familiar with the zone or area being traveled can immediatly note the changes, additions, and newly added detours in the roads. Similarly, in the embodiments of FIGS. 1 and 9, discussed above, two local zone maps would be tranmitted to the travelers; the first being the detailed map of the zone and the second showing the changes, additions, and detours to the first map. These two maps would then be presented alongside each other as is shown in FIG. 10.

Thus as described above with reference to FIG. 13, the local zone maps, and changes thereto may be produced at a single location, and conveyed by cable or long distance wireless transmission to central storage facilities 107 in each city, town, or community. From each such central city facility such maps and changes may be then transmitted to the zone transmitter 56 (FIG. 9), or the series of zone transmitters located in the different zones of the city (FIG. 1) where such map(s) are retransmitted to the receiver(s) of the travelers (FIG. 3). The maps and related video pages being wirelessly transmitted may be frequently updated as needed and transmitted over this network, or only the changes and amendments to previous maps may be transmitted over this needwork to be ultimately received by the travelers alongside the previously received maps.

Receiver Circuitry

The receiver shown in FIG. 3 includes a receiving antenna 17 and signal detector circuit 18 for receiving and detecting the video image transmissions from the ground based transmitter(s) 10, as discussed above in FIGS. 1 and 9. When the series of video maps and related pages are transmitted in sequence, each is stored in the receiver buffer memory 21. The image selector circuit 24 enables any of the video pages images to be selectively downloaded from memory to be presented on the video screen 19 for viewing by the Traveler. In the embodiment shown in FIG. 6, the image selector circuit 24 is also configured to respond to each received retroreflected ultrasonic pulse (from retroreflector 79—FIG. 7) to edit the video display listing of the streets by deleting each street name from such list as that street is passed by the Traveler. A conventioonal GPS receiver circuit 110 may also be provided in the receiver to receive the GPS satellite signals, and process such signals to derive the location, speed, and other information pertaining to the movements of the Traveler. Such additional information is superimposed upon the video page map display on the receiver screen 19.

Although it is preferred to use radio frequencies for the short range video map and related transmissions, and ultrasonic pulse transmissions for the remote control operations discussed above, it will be appreciated that other wireless modes of transmission may be employed. Similarly, the individual components being used in the systems as described above are commercially available on the open market and presently in use for other purposes than as described in the present application. For example, portable hand held receivers having memory and visual display screen are widely in use for various communication purposes, as are portable TV receivers for displaying moving TV images. The video map images are preferably transmitted in digital form from the zone transmitters and stored in the receiver memory 21 in digital form. Thereafter, such images are downloaded and converted into analog signal form for application to the visual screen display 19 of such receivers.

Further Embodiments

Figure 12:
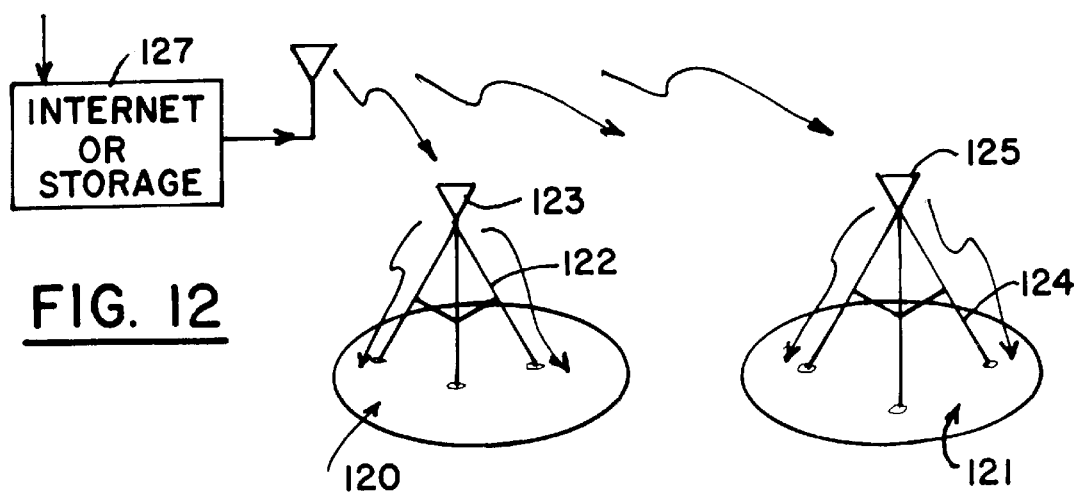
FIG. 12 is a schematic view showing the updating of plural zone transmitters.

A nationwide series of local zone maps, and other maps and video data pages for the many cities, towns, and communities may be stored and made available on the INTERNET, and made available on demand by users at any location, as shown in FIG. 12. Referring to FIG. 12, there is schematically shown two separated city areas 120 and 121, each having one or more video image tranmitters-antennas 123 and 125, respectively that beam the zone maps, and other video pages to such cities, in the same manner as discussed above. The series of maps and other video images being transmitted within each city 120, 121 may be produced locally, or elsewhere, and made available on the INTERNET international network 127. Each of the local cities are, in turn coupled to the INTERNET network using intermediate networks, by cable or wireless transmission, as shown, to provide the city transmitters with the desired ones of the local zone maps, and other video images, for retransmission to such cities.

What is claimed is:

1. In an electronic navigation system,
   wireless tranmitter means generating a plurality of video maps covering different geographic zones of an extended area,
      said transmitter means generating displaced wireless beams each directed to a different geographic zone corresponding to the video map of that zone,
      and a wireless receiver having a visual display accessible to a traveler proceeding through said area, and responsive to the transmitted video map corresponding to the zone of its location, to display said video map on its screen.

2. In the navigation system of claim 1,
   said transmitter means comprising a plurality of displaced transmitters, each generating a different one of said video maps corresponding to a different geographic zone.

3. In the navigation system of claim 1,
   said tranmitter means comprising a plurality of short range tranmitters displosed at separated locations along a roadway, and each transmitter generating a video map covering its geographic zone.

4. In the navigation system of claim 1,
   said tranmitter means being normally inactive,
   and a wireless remote control means associated with said receiver to selectively activate said tranmitter means.

5. In the navigation system of claim 1
   said transmitter means comprising a plurality of transmitters each generating a different video map, said transmitters being normally inactive,
   and wireless remote control means associated with said receiver to selectively activate said trnasmitters individually.

6. In the navigation system of claim 5,
   said plurality of tranmitters each generating a short range wireless beam directed to a different location along a roadway, and containing a video map covering its zone along said roadway.

7. In the navigation system of claim 5,
   said said plural tranmitters being located at a road intersection in different directions,
   each tranmitter covering a different direction of said intersecting roads,
   whereby the receiver displays the geographic zone in the direction of travel of the receiver with respect to said intersection.

8. In an electronic navigation system, covering a plurality of displaced zones within an extended geographic,
   wireless tranmission means generating a plurality of beams each containing a video map covering a different one of said zones,
   a wireless receiver having a visual display, accessible to a traveler proceeding in said geographic area, said receiver selectively receiving and displaying said video maps,
   selective control means for said receiver for enabling the traveler to manually select any desired one of said video maps for display on said receiver,
   whereby a traveler proceeding within said geographic area can independantly determine the zone of his location and can select that one of the video maps for display showing said zone.

9. In the navigation system of claim of claim 8,
   said tranmitter means comprising a plurality of displaced transmitters each generating a different one of said video maps corresponding to the location of that transmitter.

10. In the navigation system of claim 8,
    said tranmitter means comprising a plurality of low power, short range tranmitters, displaced from each other, and each directing its wireless beam to cover a different zone corresponding to its video map.

11. In the navigation system of claim 8,
    said transmitter means being normally inactive and not tranmitting said beams, and wireless remote control means associaited with said receiver for activating said tranmitter means into generation.

12. In the navigation system of claim 8, said tranmitter means comprising a plurality of tranmitters, each generating a different one of said video maps, and remote control means associated with said receiver for selectively activating individual ones of said transmitters, thereby to receive and display on said receiver screen the video map corresponded to the selected tranmitter.

13. In the navigation system of claim 8, said tranmitter means comprising a plurality of low power, short range tranmitters generating different ones of said video maps, and the transmitters directed to wirelessly transmit to different zones of said geographic area, said tranmitters being normally inactive, and remote control means associaited with said receiver for selectively activating individual ones of said transmitters to generate their video maps.

14. In an electronic navigation system, wireless tranmitter means for generating a plurality of video maps each covering a different zone of an extended geographic area, a wireless receiver having a memory for receiving and storing some of the video maps in the receiver memory, said receiver having a visual display and having manually operated selection means for downloading any of the stored video maps to the receiver visual display, thereby enabling a user to obtain a desired video map for display.

15. In the navigation system of claim 14, said tranmitter means tranmitting the plurality of video maps throughout the geographic area.

16. In the navigation system of claim 14, said transmitter means comprising a plurality of displaced tranmitters with different ones of said tranmitters generating different video maps.

17. In the navigation system of claim 14, said said tranmitter means being normally inactive, and remote control means for activating said trsnmitter means to generate a video map.

18. In the navigation system of claim 14, said tranmitter means comprising a plurality of transmitters generating said video maps, and a remote control means associated with the receiver for selectively activating a tranmitter to generate its video map.

19. In the navigation system of claim 14, said video maps for each zone being generated in multiple parts, with one part containing a master map of that zone, and a second part containing changes in the master map that occured after the master map was made.

20. In the navigation system of claim 14, said transmitter means comprising a plurality of tranmitters generating said plurality of video maps, and said receiver being responsive to each one of the transmitters when it is located in the geographic zone covered by said tranmitter, thereby to display the video map of that zone, and said receiver having means for erasing from said display any previously displayed video map.

21. A cellular navigation system subdividing an extended geographic region into a series of contiguous cellular zones, a plurality of low power, limited range wireless transmitters, with said tranmitters being displaced from one another and each located within a different cellular zone and located near a roadway, each tranmitter generating a video map covering its cellular zone, a wireless receiver having a visual display for receiving the cellular video map of each zone when it is located within that cellular zone, and control means for said receiver for erasing any previously displayed video map when the receiver enters into a different cellular zone.

22. In the navigation system of claim 21, said tranmitters being normally inactive and remote control means associated with said receiver for activating the cellular zone tranmitter when the receiver is located within the cellular zone of that tranmitter.

23. In the navigation system of claim 21 said tranmitters generating said video maps in multiple part, with one part containing a master map of that zone and a second part containing the changes in the map zone that occured after the creation of the master map part.

24. In the navigation system of claim 21 plural tranmitters being located within each cellular zone, and disposed to tranmit their video maps in different directions along road road intersections.

* * * * *